US010743665B1

(12) United States Patent
Heroux et al.

(10) Patent No.: US 10,743,665 B1
(45) Date of Patent: Aug. 18, 2020

(54) RELEASEABLY MOUNTABLE REVOLVING SHELF

(71) Applicant: Hip Innovations, LLC, Calabasas, CA (US)

(72) Inventors: Steve Heroux, Hidden Hills, CA (US); Sonia Makurdsik, Westlake, CA (US)

(73) Assignee: HIP INNOVATIONS, LLC, Calabasas, CA (US)

( * ) Notice: Subject to any disclaimer, the term of this patent is extended or adjusted under 35 U.S.C. 154(b) by 0 days.

(21) Appl. No.: 16/577,458

(22) Filed: Sep. 20, 2019

(51) Int. Cl.
*A47B 96/06* (2006.01)
*F16B 47/00* (2006.01)
*F21Y 115/10* (2016.01)
*F21V 19/00* (2006.01)

(52) U.S. Cl.
CPC ............ *A47B 96/06* (2013.01); *F16B 47/006* (2013.01); *A47B 2220/0075* (2013.01); *F21V 19/003* (2013.01); *F21Y 2115/10* (2016.08)

(58) Field of Classification Search
CPC ............ A47B 96/06; A47B 2220/0075; A47B 96/022; A47B 96/068; A47B 49/004; A47B 11/00; F16B 47/006
See application file for complete search history.

(56) References Cited

U.S. PATENT DOCUMENTS

| | | | | |
|---|---|---|---|---|
| 782,158 A | * | 2/1905 | Miller | A47B 11/00 108/94 |
| 1,325,143 A | * | 12/1919 | Conterio | F16M 13/025 108/42 |
| 1,687,149 A | * | 10/1928 | Shauer | F25D 25/027 108/94 |
| 2,128,118 A | | 8/1938 | Burford | |
| 3,033,376 A | * | 5/1962 | Eastman | A47B 96/022 108/42 |
| 4,762,237 A | * | 8/1988 | Newton | F25D 25/027 211/115 |
| 4,820,556 A | * | 4/1989 | Goldman | A01K 63/006 119/253 |
| 4,848,542 A | | 7/1989 | Burnette | |
| 5,348,168 A | | 9/1994 | Emery | |
| D379,412 S | * | 5/1997 | Hampshire | D6/562 |
| 5,641,080 A | * | 6/1997 | Humphrey | A47B 49/004 211/163 |
| 5,992,654 A | * | 11/1999 | Dente, Jr. | A47B 96/022 211/90.01 |

(Continued)

FOREIGN PATENT DOCUMENTS

| | | |
|---|---|---|
| GB | 861501 | 2/1961 |
| GB | 2118238 | 10/1983 |

(Continued)

OTHER PUBLICATIONS

SnapUp Shelf—as seen on TV product (photographs enclosed).
SnapUp™ Corner Shelf_ Bed Bath & Beyond <https://www.bedbathandbeyond.com/store/product/snapup-corner-shelf/1045530852>.

*Primary Examiner* — Hanh V Tran
(74) *Attorney, Agent, or Firm* — Cialo & Thomas, LLP

(57) ABSTRACT

A releaseably mountable revolving shelf that uses suction pad mounting and incorporates a mechanism for the manual release of the suction pads is presented. The releaseably mountable revolving shelf also features an LED lighting element that improves visibility in the area where the shelf is mounted.

20 Claims, 18 Drawing Sheets

(56) References Cited

U.S. PATENT DOCUMENTS

| | | | | |
|---|---|---|---|---|
| 6,059,128 | A * | 5/2000 | Wang | A47B 96/02 108/42 |
| 6,081,928 | A | 7/2000 | Bourne | |
| 6,263,808 | B1 * | 7/2001 | Robbins | A47B 49/006 108/94 |
| D451,743 | S | 12/2001 | Henderson | |
| D489,966 | S | 5/2004 | Ho | |
| 7,455,269 | B1 * | 11/2008 | Chien | F16B 47/006 248/205.8 |
| 8,544,390 | B1 * | 10/2013 | Bahnsen | A47G 23/08 108/94 |
| 8,839,980 | B2 * | 9/2014 | Baines | A47K 3/281 211/90.03 |
| 9,124,350 | B2 | 9/2015 | Biancamano | |
| 9,308,463 | B2 | 4/2016 | Bartels | |
| 9,351,566 | B2 * | 5/2016 | Searer | A47B 49/006 |
| 9,528,753 | B1 * | 12/2016 | Conner, Sr. | F25D 25/027 |
| 10,213,018 | B1 * | 2/2019 | Karins, Sr. | A47B 96/022 |
| 2003/0173321 | A1 * | 9/2003 | Craft | A47B 49/006 211/144 |
| 2006/0282936 | A1 | 12/2006 | Olson | |
| 2008/0083353 | A1 * | 4/2008 | Tuttle | A47B 96/02 108/47 |
| 2008/0217826 | A1 * | 9/2008 | Kim | F16B 47/006 269/21 |
| 2008/0230662 | A1 * | 9/2008 | Takahashi | F16B 47/006 248/206.2 |
| 2009/0308286 | A1 * | 12/2009 | Bourbeau | A47B 96/00 108/23 |
| 2010/0206828 | A1 * | 8/2010 | Gottschalk | A47B 96/025 211/144 |
| 2011/0297804 | A1 * | 12/2011 | Fan | F16B 47/006 248/206.2 |
| 2012/0049019 | A1 * | 3/2012 | Chen | F16B 2/185 248/206.2 |
| 2012/0199051 | A1 * | 8/2012 | Edinger | A47B 5/006 108/139 |
| 2014/0197288 | A1 * | 7/2014 | Yang | F16B 47/006 248/205.9 |
| 2014/0291466 | A1 * | 10/2014 | Amendolea | B60S 13/02 248/349.1 |
| 2014/0345507 | A1 * | 11/2014 | Pendleton | A47B 81/005 109/48 |
| 2015/0079823 | A1 * | 3/2015 | Lindblom | F21V 21/34 439/110 |
| 2015/0083029 | A1 * | 3/2015 | Pan | A47B 13/088 108/104 |
| 2015/0108134 | A1 * | 4/2015 | Fangyuan | F16M 13/022 220/483 |
| 2015/0289681 | A1 * | 10/2015 | Sun | A47F 5/0043 108/23 |
| 2015/0330438 | A1 * | 11/2015 | Shi | A47K 10/14 248/205.8 |
| 2016/0166109 | A1 * | 6/2016 | Banal | A47J 37/0781 108/50.13 |
| 2016/0215813 | A1 * | 7/2016 | Huang | F16B 47/006 |
| 2016/0272124 | A1 * | 9/2016 | Goddert | B60R 9/04 |
| 2016/0340948 | A1 * | 11/2016 | McCullough | E05C 19/188 |
| 2017/0067275 | A1 * | 3/2017 | Tomassi | E05C 19/00 |
| 2018/0363845 | A1 * | 12/2018 | Alifeld | F16M 13/022 |

FOREIGN PATENT DOCUMENTS

| | | | | |
|---|---|---|---|---|
| GB | 2202427 A | * | 9/1988 | A47B 96/022 |
| JP | 09187333 A | * | 7/1997 | |
| JP | 10337228 A | * | 12/1998 | |
| JP | 11103956 A | * | 4/1999 | |
| JP | 2011247446 A | * | 12/2011 | |
| JP | 2014073339 A | * | 4/2014 | |
| WO | 2016035913 | | 3/2016 | |

* cited by examiner

US 10,743,665 B1

RELEASEABLY MOUNTABLE REVOLVING SHELF

BACKGROUND OF THE INVENTION

Field of the Invention

This invention relates to revolving shelves and, more particularly, to a revolving shelf which can be releasably attached to a corner mounting surface for ease of installation and repositioning.

Background Art

Revolving shelves are devices that are used to store and provide ready access to a variety of household items. Revolving shelves have become increasingly popular in recent years and are commonly used in closets, kitchens, garages and shower enclosures, among others. Many prior art revolving shelves are built into custom cabinets or are attached to walls using fixed mounting brackets that are mechanically fastened to a wall. These fixed types of construction or attachment methods limit a revolving shelf to a single location within a home or building which reduces their overall utility. Removal of such shelf designs is generally not practical, as removal typically entails the removal of screw or nail type fasteners which leave holes in the walls. Moreover, the walls or other mounting surfaces are frequently damaged during removal attempts.

There is a need in the art for an improved revolving shelf. Ideally, such an improved revolving shelf would feature a secure mounting system such as suction cups or pads, yet would be readily removable for cleaning, repositioning or replacement. Preferably, an improved revolving shelf would also provide for easier access to items stored in the shelf than heretofore has been available.

SUMMARY OF THE INVENTION

The present invention meets a long-felt need in the art by providing a releaseably mountable revolving shelf product that uses suction pad mounting and incorporates a mechanism for the manual release of the suction pads. The releaseably mountable revolving shelf improves user access to stored items. The releaseably mountable revolving shelf also features removable, light emitting elements which improve visibility in the corner wall area where the releaseably mountable revolving shelf is mounted. The above and other advantages of the releaseably mountable revolving shelf of the present invention will be described in more detail below.

DETAILED DESCRIPTION OF THE PREFERRED EMBODIMENTS

Figure 1:
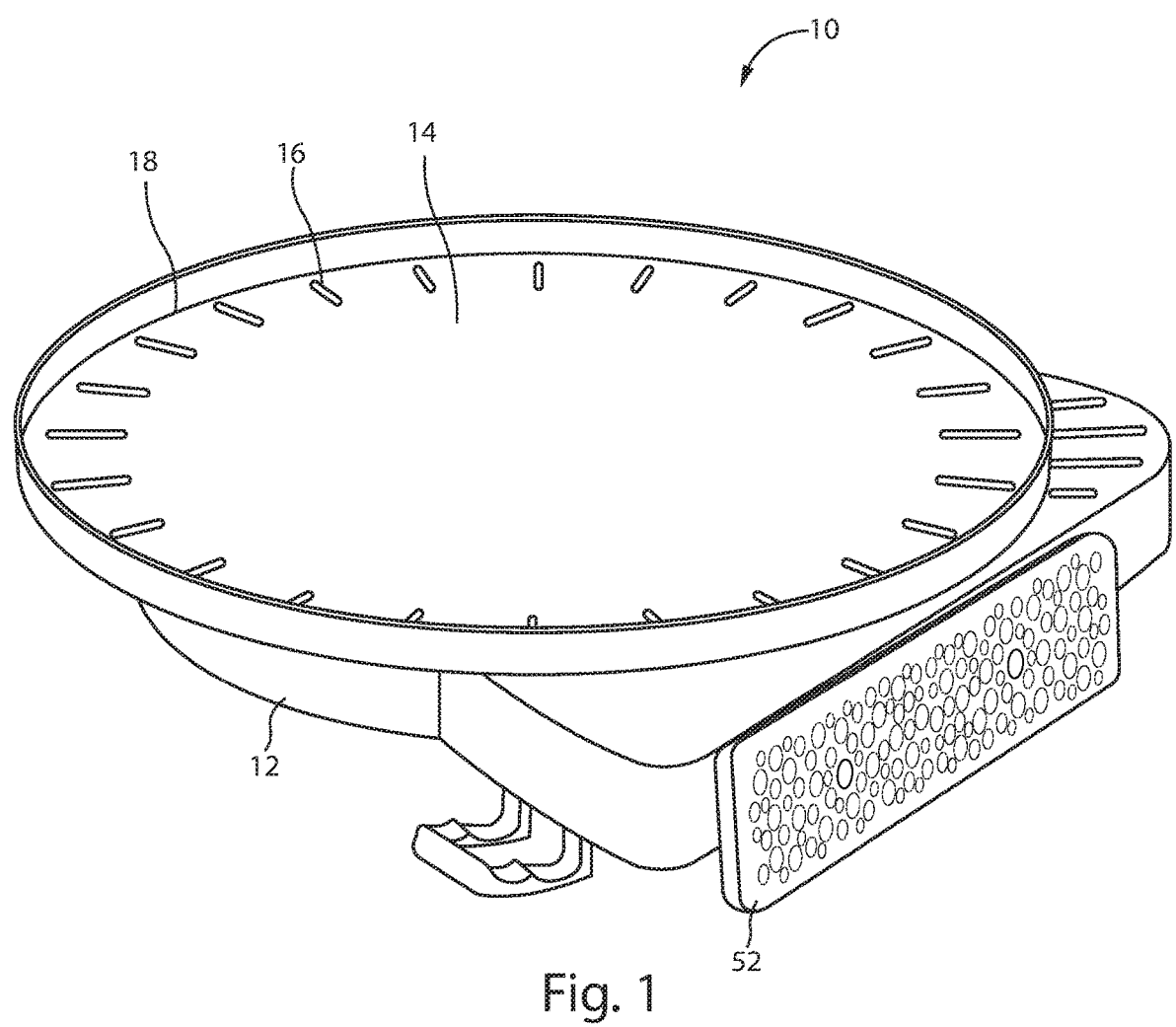
FIG. 1 is a perspective view of the releaseably mountable revolving shelf of the present invention.
Figure 2:
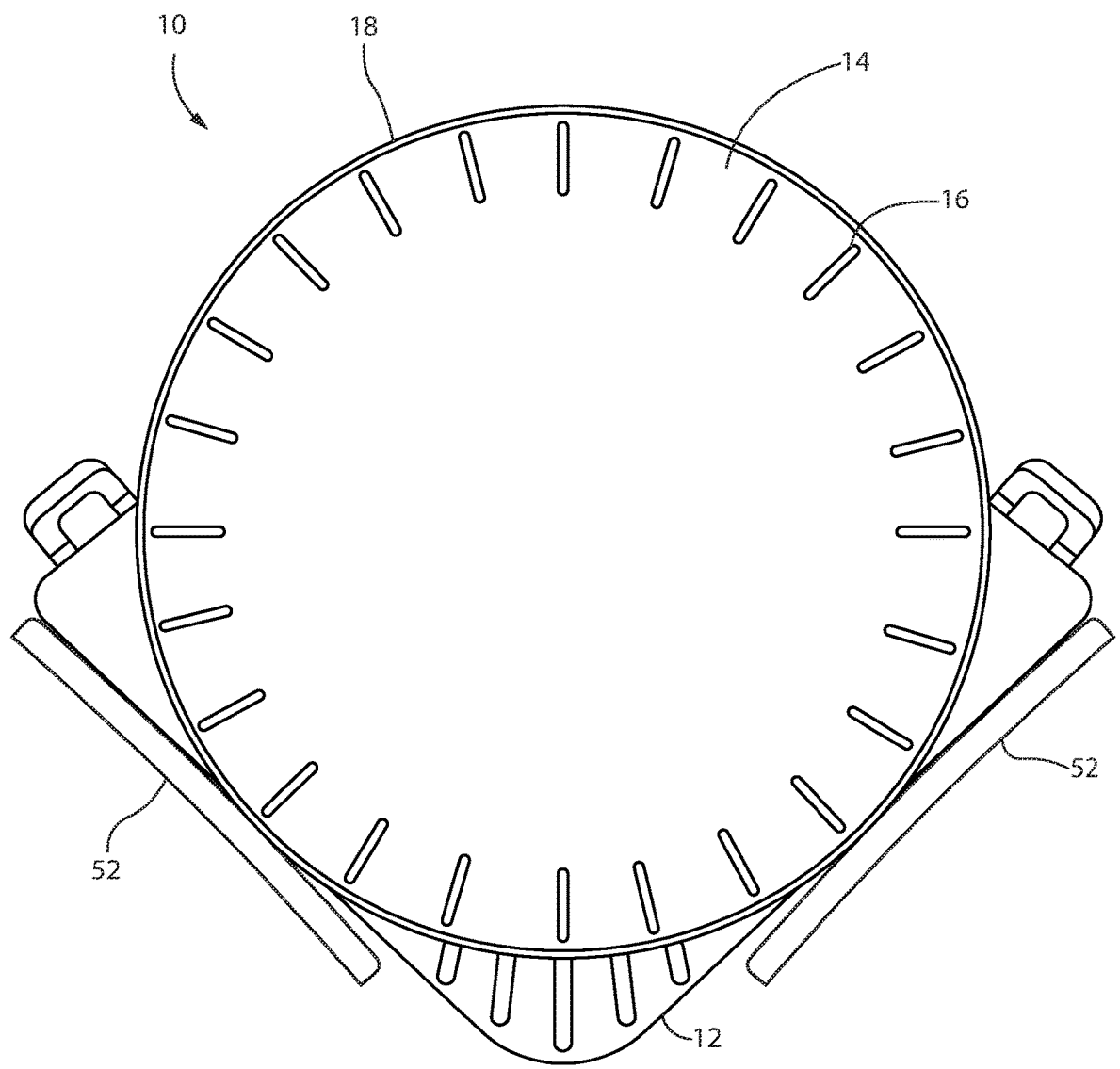
FIG. 2 is a top view of the releaseably mountable revolving shelf of the present invention.

The present invention will now be described more fully hereinafter with reference to the accompanying drawings, in which preferred embodiments of the invention are shown. The invention however, may be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

With reference to FIGS. 1-7, the releaseably mountable revolving shelf of the present invention 10 comprises a base unit 12 with a revolving shelf 14 disposed above the base unit 12 and pivotally attached to the base unit 12. The revolving shelf 14 is disc shaped and includes drainage slots 16 spaced radially about a perimeter 18 of the revolving shelf 14. The revolving shelf 14 includes a center hub 20 where the center hub 20 is comprised of four equally spaced prongs 22 which are in the form of arc sectors. (See FIG. 7.) Each prong 22 includes a radially outwardly facing ledge 24. The prongs 22 are configured to snap within a hole 26 formed in a shelf support surface 28 of the base unit 12. The radially outwardly facing ledges 24 of each prong 22 serve to secure the center hub 20 of the revolving shelf 14 to the shelf support surface 28 of the base unit 12. Once secured the revolving shelf 14 cannot be inadvertently separated from the base unit 12.

With reference to FIGS. 5 and 7 and 12-13, the shelf support surface 28 of the base unit 12 includes a lower annular bushing surface 30 and the revolving shelf 14 includes an upper annular bushing surface 34. The lower annular bushing surface 30 and the upper annular bushing surface 34 are concentrically aligned. Disposed between lower annular bushing surface 30 and the upper annular bushing surface 34 is an annular bushing 32. The annular bushing 32 spaces and supports the revolving shelf 14 above the shelf support surface 28. The annular bushing 32 has a first surface 36 and a second surface 40. Equally spaced about the first surface 36 of the annular bushing 32 are bearing elements 38. When assembled, the bearing elements 38 of the first surface 36 of the annular bushing 32 abut the lower annular bushing surface 30 of the shelf support surface 28, whereas the second surface 40 of the annular bushing 32 abuts the upper annular bushing surface 34 of the revolving shelf 14.

With reference to FIGS. 3-6, and 8, the base unit 12 comprises an upper portion 42 which attaches to a lower portion 44, via screws 107. The upper portion 42 includes the shelf support surface 28. Housed within the lower portion 44 is a suction pad attachment and release mechanism 46 which is operated by an operating handle 48 which protrudes from a bottom surface 50 of the lower portion 44. The suction pad attachment and release mechanism 46 functions to extend and retract the suction pads 52 from the sides of the base unit 12.

Figure 8:
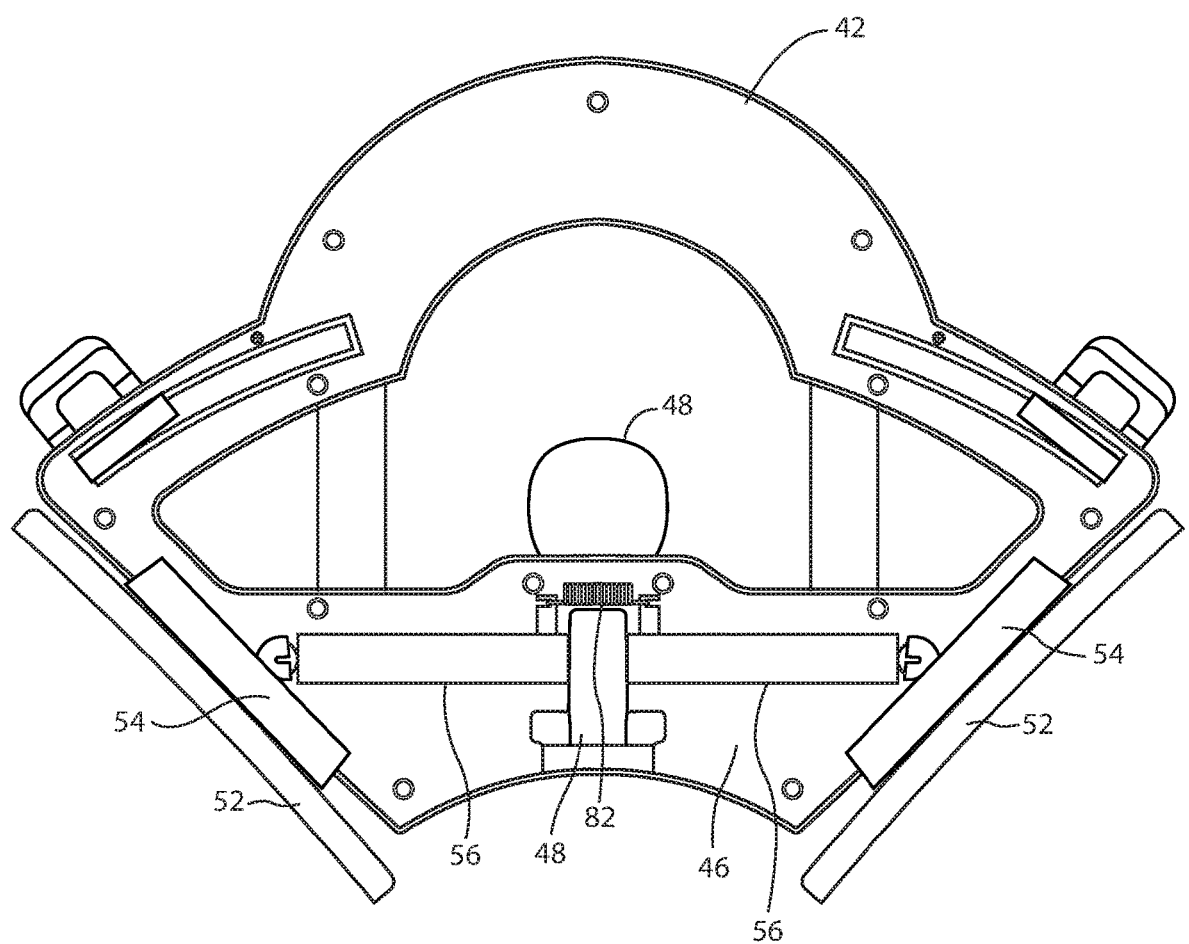
FIG. 8 is a bottom view of the releaseably mountable revolving shelf of the present invention with light emitting elements and a lower portion of the base unit removed to show the internal parts of the releaseably mountable revolving shelf.
Figure 9A:
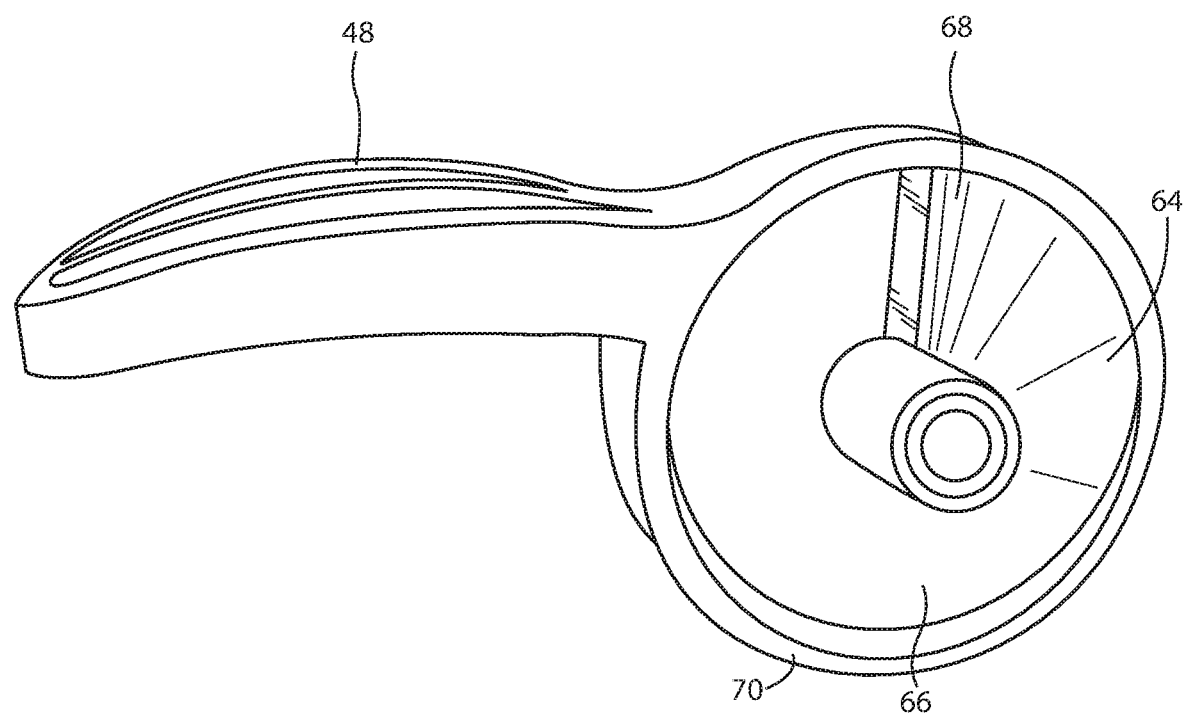
FIG. 9A is an enlarged perspective view of the operating lever shown in FIG. 8.
Figure 9B:
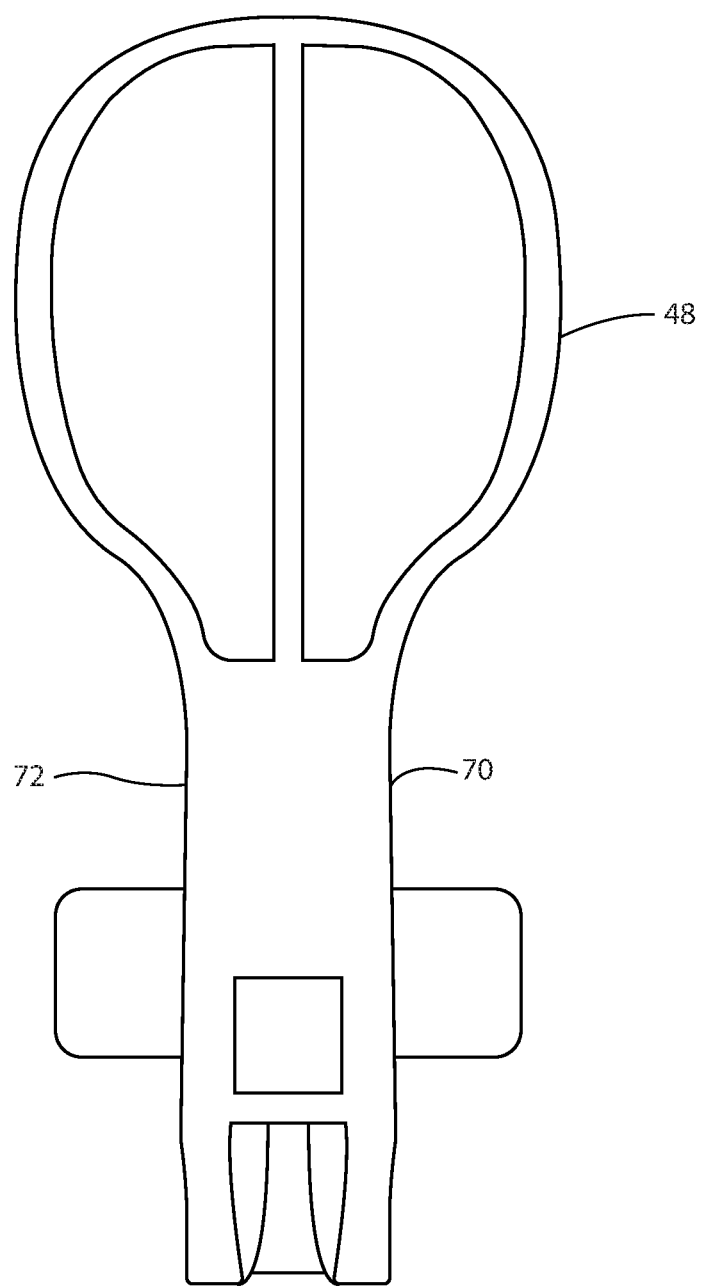
FIG. 9B is a top view of the operating lever shown in FIG. 9A.
Figure 9C:
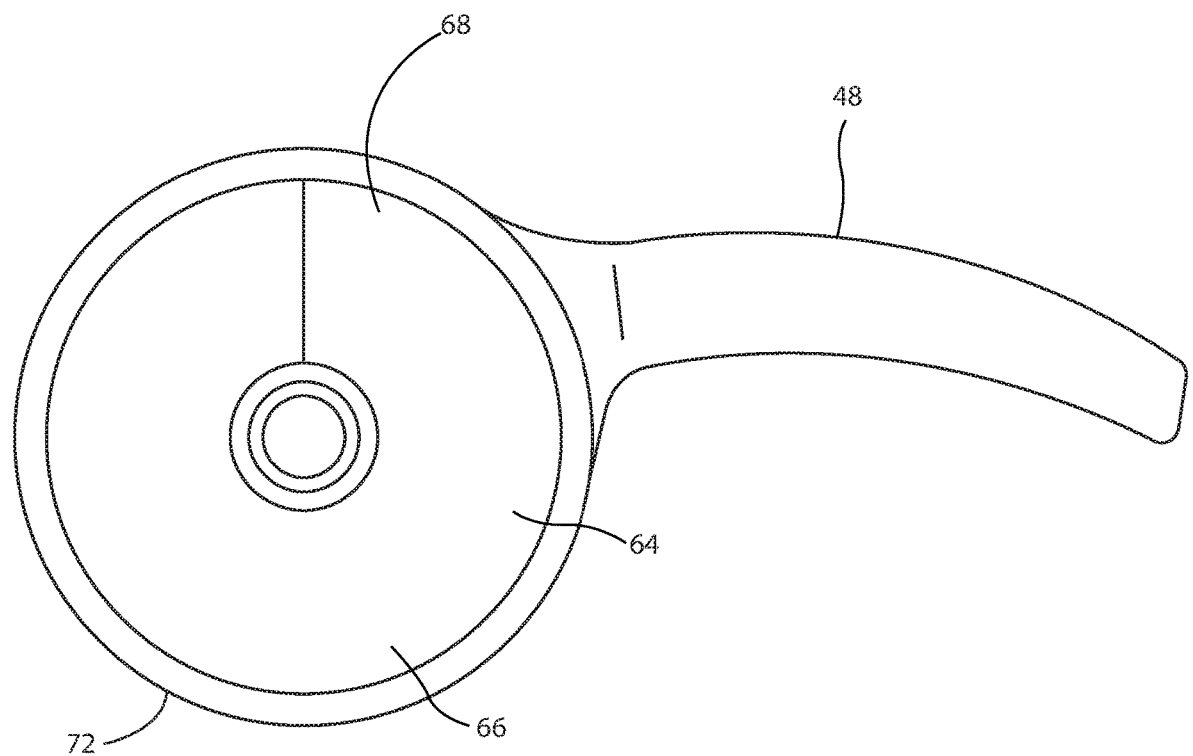
FIG. 9C is a side view of the operating lever shown in FIG. 9A.
Figure 10:
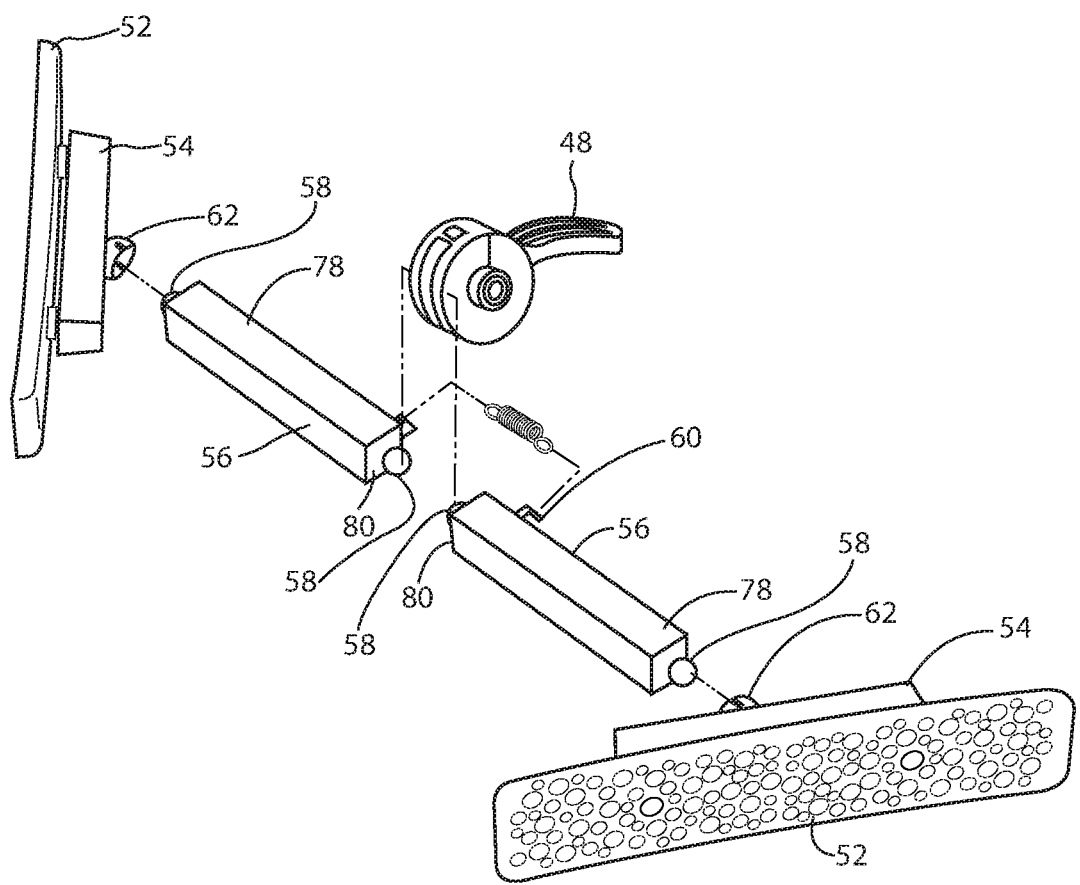
FIG. 10 is an exploded view of the internal parts of the releaseably mountable revolving shelf of the present invention.

With reference to FIGS. 8-10, the suction pad attachment and release mechanism includes the operating lever 48, transfer links 56 and transfer blocks 54. The operating lever 48 has a first side 70 and second side 72. Formed on both the first side 70 and second side 72 is a circular ramp 64, where each circular ramp 64 has a high surface section or high position 68 which corresponds to a suction pad 52 extended position 74 and a low surface section or low position 66 which corresponds to a suction pad retracted position 76. The transfer links 56 are equipped with ball ends 58 at each end of each link. At a first end 80, the ball ends 58 of the transfer links abut and ride on the circular ramps 64 of the operating lever 48. At a second end 78, the ball ends 58 engage a hollow, half spherical receptacle 62 in the transfer blocks 54. The transfer blocks 54 are attached via a snap fit to the suction pads 52. Each transfer link is also equipped with a biasing spring connector element 60 wherein a biasing spring 82 (see FIG. 8) biases each transfer link against the high and low surface sections of the circular ramp 64 via the ball ends 58 of the first ends 80 of the links.

When the operating lever 48 is in the retracted position (see FIG. 8), the suction pads are in the retracted position 76 (see FIG. 8). In the retracted position, the ball ends 58 of the first ends 80 of the transfer links 56 engage the low surface sections 66 of the circular ramp 64, and the biasing spring 82 pulls the suction pads 52 inwardly via transfer links 56 and transfer blocks 54.

Figure 6:
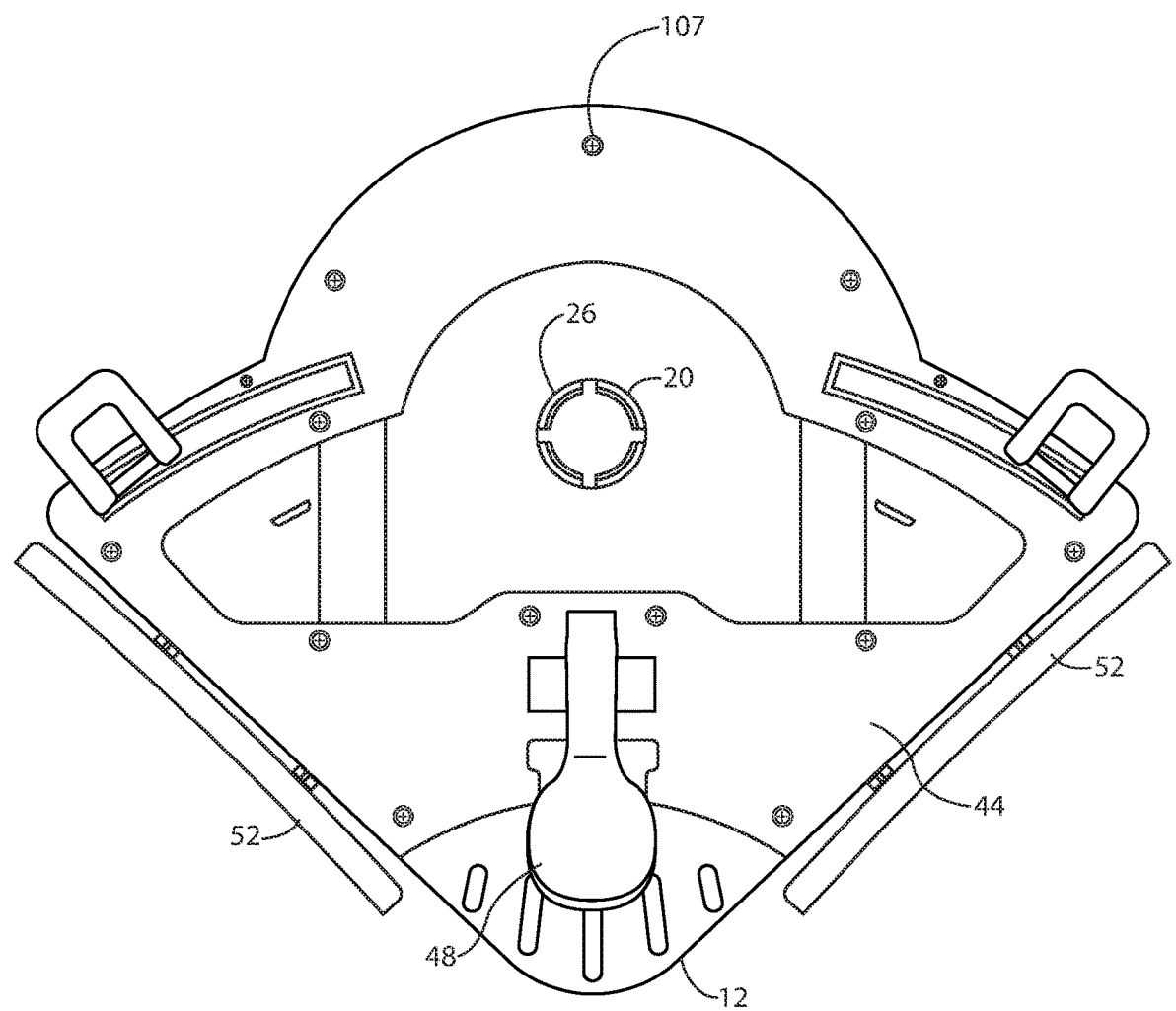
FIG. 6 is a bottom view of the releaseably mountable revolving shelf of the present invention with the light bar removed.
Figure 7:
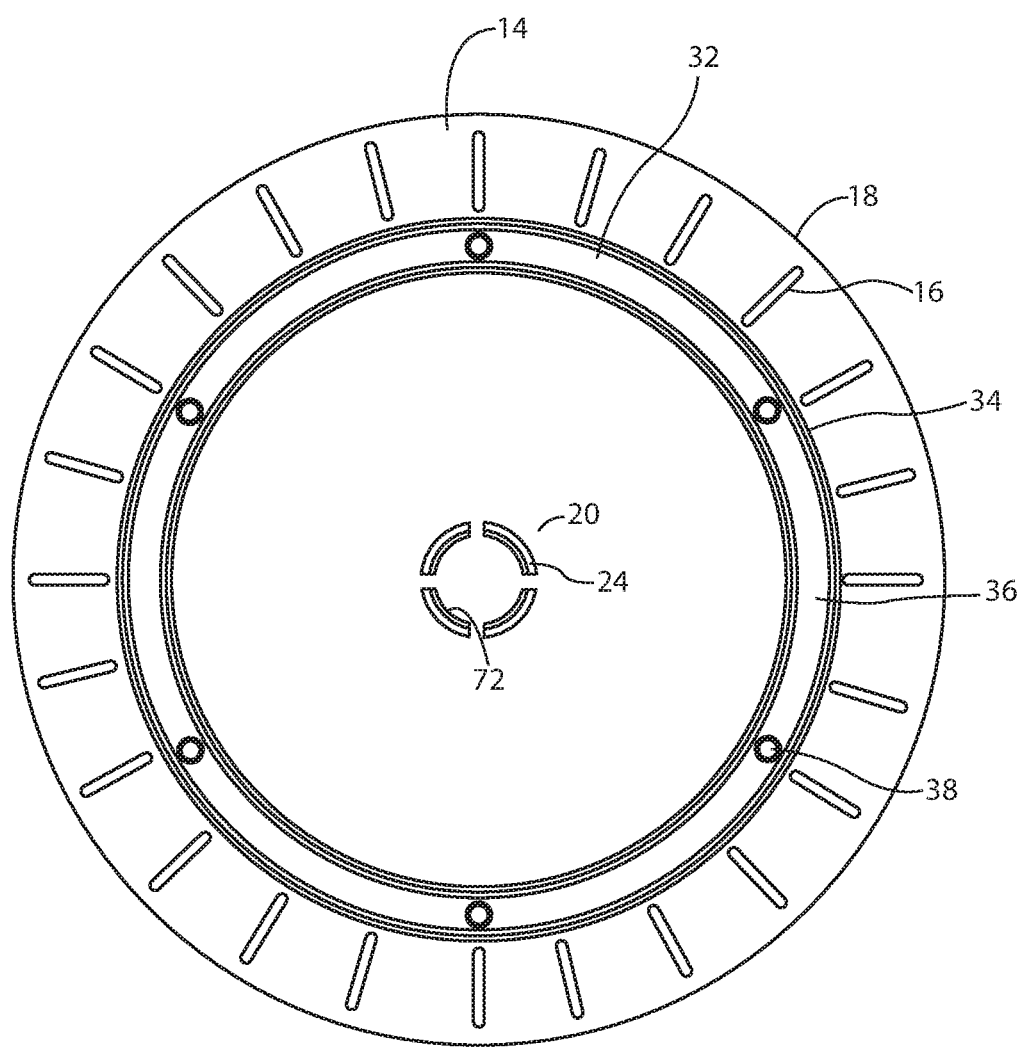
FIG. 7 is a bottom view of the revolving shelf of the releaseably mountable revolving shelf of FIG. 1.

When the operating lever 48 is in the extended position (see FIG. 6), the suction pads are in the extended or clamp position (see FIG. 6). As the operating lever 48 is rotated to the extended position, the circular ramps 64 rotate to bring the ball ends 58 of the first ends 80 of the transfer links 56 in contact with the high surface sections 68. This has the effect of pushing the transfer links 56 outwardly, which in turn causes the transfer links 56 to push the transfer blocks 54 outwardly, which pushes the suction pads 52 connected to the transfer blocks outwardly.

With reference to FIGS. 14A-14D, the suction pads 52 are formed, in the exemplary embodiment, with an inner support element 84 and an outer pad element 86. The inner support element is molded from a relatively rigid, but still flexible plastic material, whereas the outer pad element 86 is molded from a relatively soft and flexible rubber-like polymer material. Suitable materials for both the inner support element 84 and the outer pad element 86 are commercially available and known in the art. The outer pad element 86 is molded over the inner support element 84 to provide a combination of flexibility and adhesion characteristics that would not be obtainable using either material alone.

The suction pad 52 has a first or longitudinal axis 94 and a perpendicular second or lateral axis 96. The suction pad 52 has a first curvature 98 about the first axis 94 and a second curvature 100 about the second axis 96. This compound curvature makes an outer surface 88 of the outer pad element 86 function as a large suction element. The adhesive ability of the outer surface 88 is further enhanced by equipping the surface 88 with a pattern of first round suction dimples 90 and second round suction dimples 92. In the exemplary embodiment, the first round suction dimples 90 are larger than the second round suction dimples 92.

Suction pads 52 as described above are the preferred method of attaching the releaseably mountable revolving shelf to a corner wall surface. The suction pads 52 are suitable for use with non-porous surfaces as well as surfaces such as drywall. Those skilled in the art will recognize however that attachment means other than suction pads can be used to mount the releaseably mountable revolving shelf to a corner wall surface. For example, the design for the releaseably mountable revolving shelf can be modified to use round suction cups, double-sided adhesive tape, or mechanical fasteners as the means to mount the revolving shelf to a wall.

Figure 3:
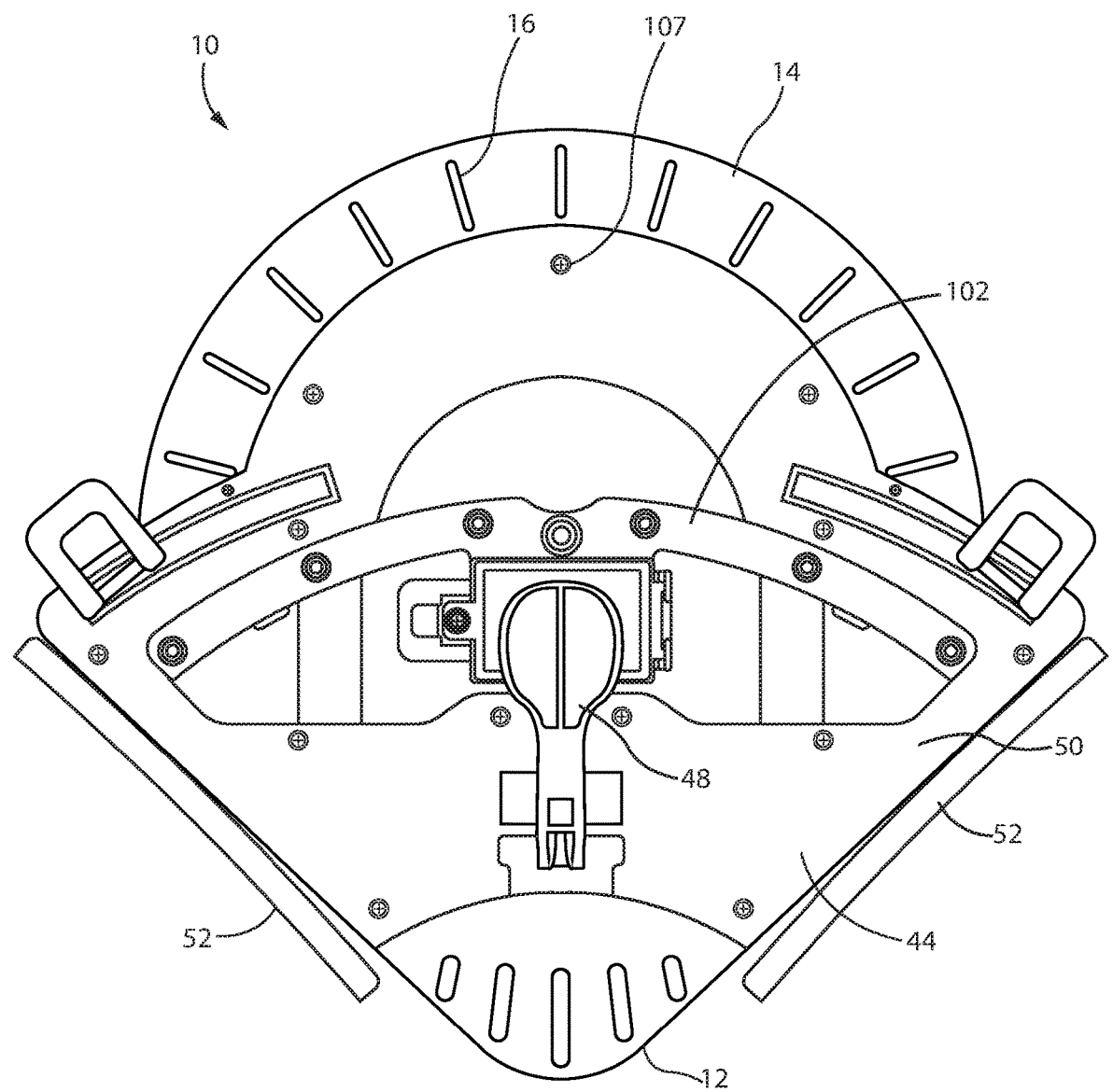
FIG. 3 is a bottom view of the releaseably mountable revolving shelf of the present invention.
Figure 4:
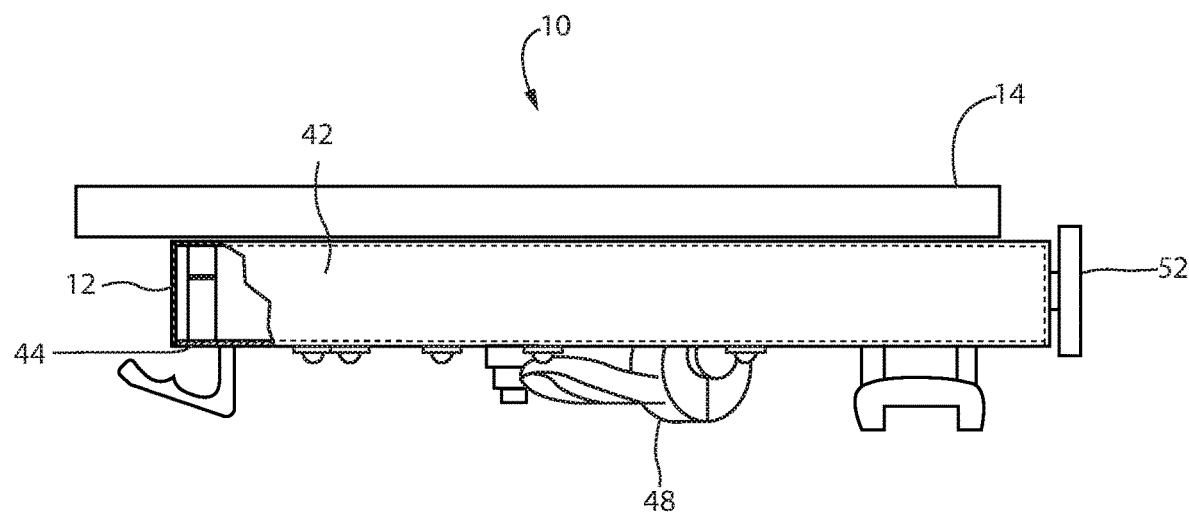
FIG. 4 is a side view of the releaseably mountable revolving shelf of the present invention.
Figure 5:
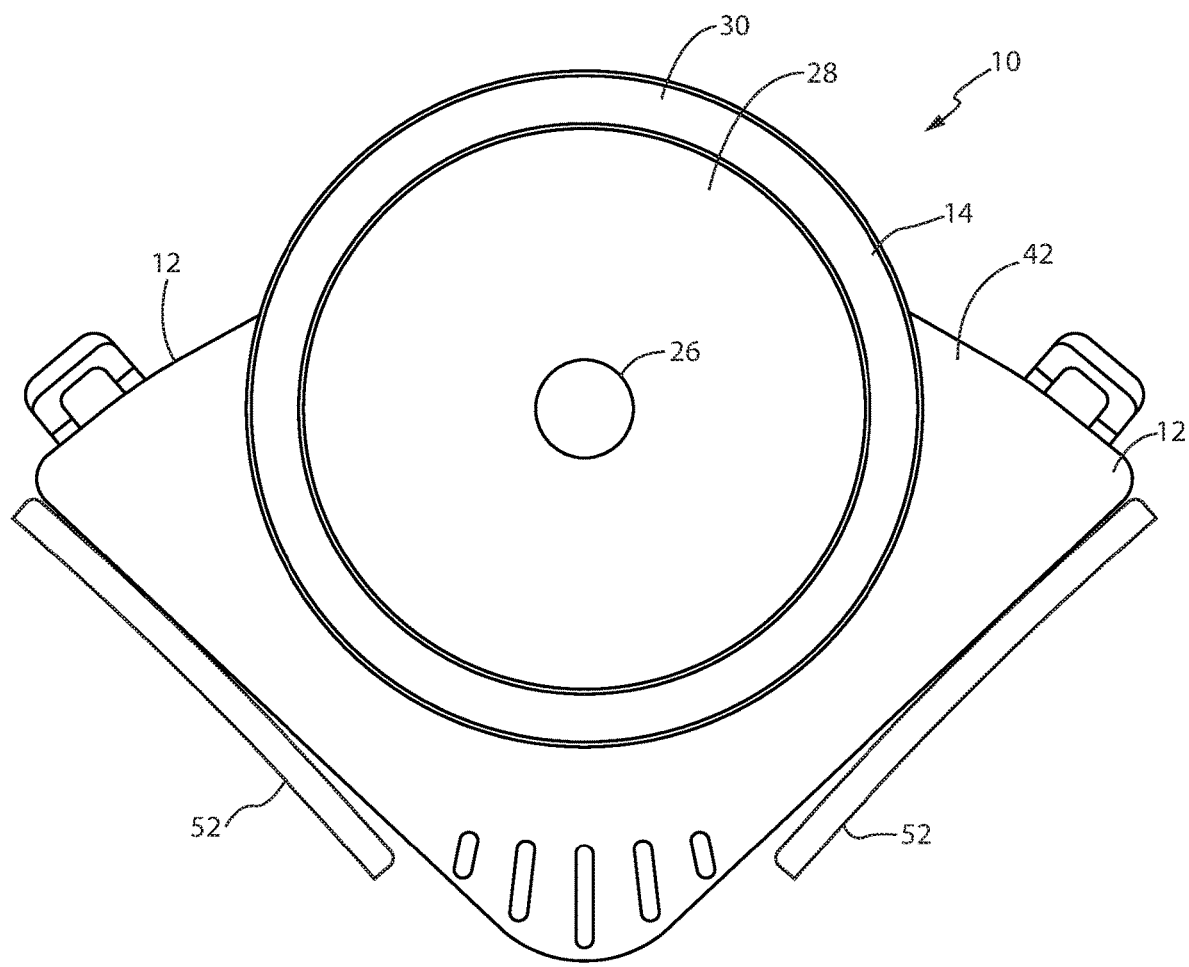
FIG. 5 is top view of the releaseably mountable revolving shelf of the present invention with the revolving shelf removed.
Figure 11:
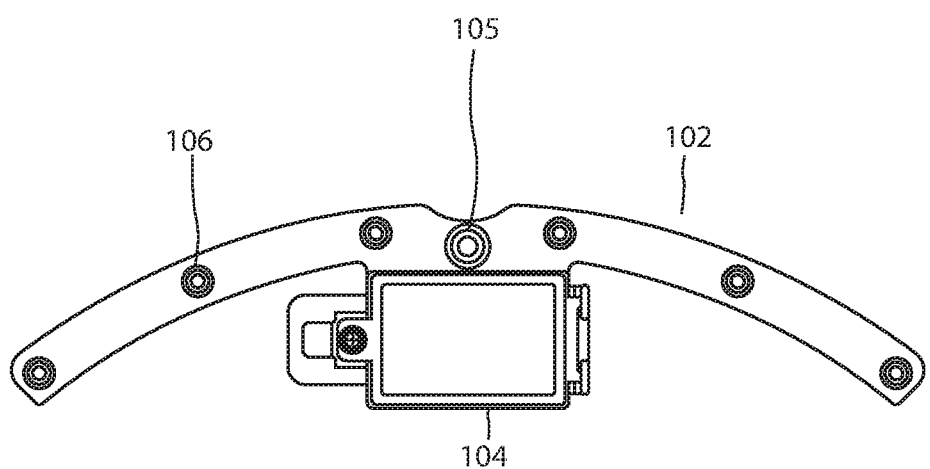
FIG. 11 is a top view of the light emitting elements shown in FIG. 3.
Figure 12:
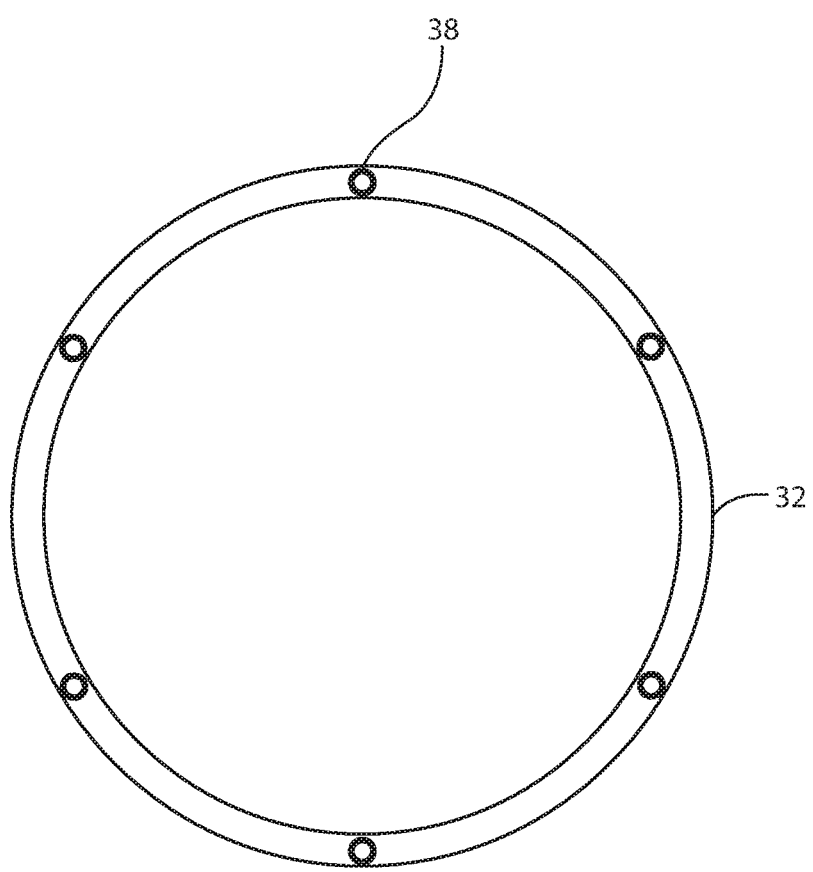
FIG. 12 is a top view of the ring shown in FIG. 7.
Figure 13:
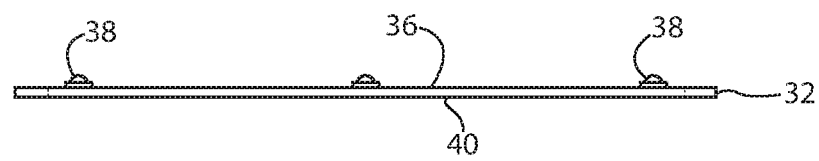
FIG. 13 is a side view of the ring shown in FIG. 12.
Figure 14A:
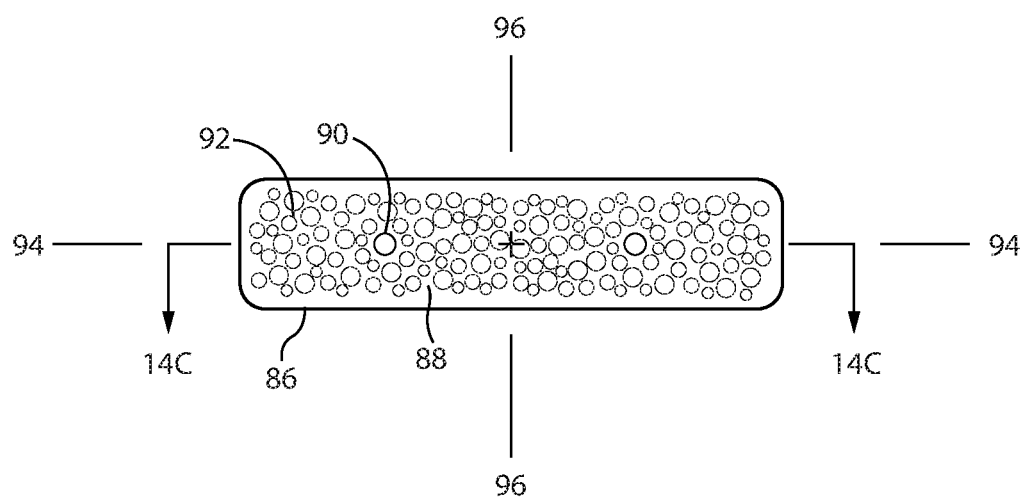
FIG. 14A is a bottom view of one of the suction pads shown in FIG. 1.
Figure 14B:
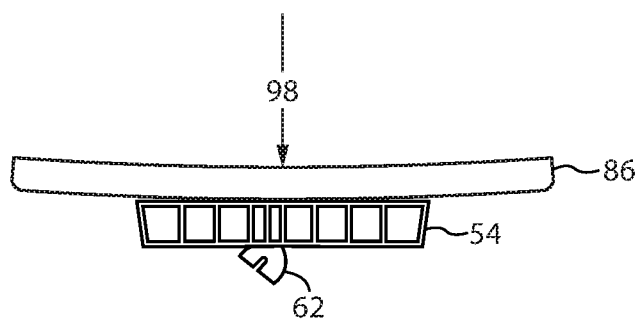
FIG. 14B is a top view of the suction pad shown in FIG. 14A.
Figure 14C:
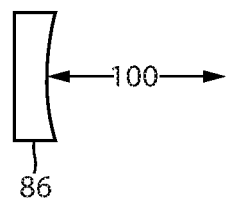
FIG. 14C is a partial end view of the suction pad shown in FIG. 14A.
Figure 14D:
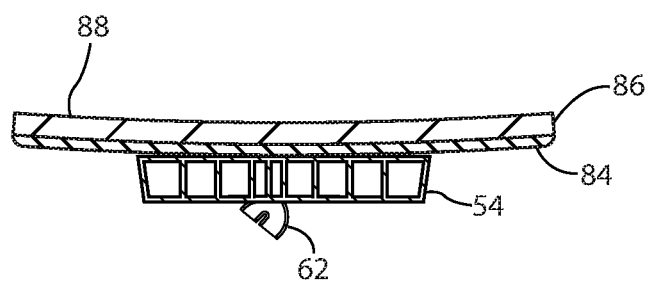
FIG. 14D is a cross-sectional view taken along the line 14C-14C of the suction pad shown in FIG. 14A.

With reference to FIGS. 3 and 11, the releaseably mountable revolving shelf of the present invention 10 also features a lighting element 102 which is removably attachable to the base unit 12. The lighting element 102 includes a waterproof battery case 104 and a plurality of light emitting elements, i.e. LEDs 106, spaced along the lighting element, and push button switch 105.

Installation of the releaseably mountable revolving shelf of the present invention 10 is simple and straight forward, the operating lever 48 is placed in the closed position (see FIG. 3) and the releaseably mountable revolving shelf is positioned on a corner wall surface such that the suction pads 52 abut the walls of the corner. The releaseably mountable revolving shelf 10 is then pressed firmly against the wall surfaces and the operating lever 48 is actuated, i.e. pulled downwardly, such that the suction pads 52 are pressed against the walls of the corner wall surface.

The outward pushing (extension) motion of the suction pads 52 which occurs when the operating lever 48 is pulled downwardly causes the suction pads 52 to flex and better conform to the wall surfaces to which they are pressed. This pushing action creates better adhesion of the suction pads against the walls of the corner mounting surface, then would be obtainable by a user pressing the releaseably mountable revolving shelf against the walls of the corner mounting surface alone. To remove the releaseably mountable revolving shelf for cleaning or repositioning, a user moves the operating lever upwardly, which causes the suction pads to retract inwardly. This retraction action assists in breaking the seal of the suction pads against the walls of the shower enclosure and thereby aids in removal or repositioning of the releaseably mountable revolving shelf.

As disclosed above, the present invention releaseably mountable revolving shelf meets a long-felt need in the art by providing a revolving shelf that uses suction pad mounting and incorporates a mechanism for the attachment and release of the suction pads. The revolving shelf improves access to stored items. The releaseably mountable revolving shelf also features other desirable features such as a lighting element featuring a plurality of LEDs, which improves lighting in the area of the corner wall surface upon which the revolving shelf is mounted.

While the present invention has been described with regards to particular embodiments, it is recognized that additional variations of the present invention may be devised without departing from the inventive concept.

What is claimed is:

1. A releaseably mountable revolving shelf, comprising:
 a base unit, a revolving shelf, a suction pad movable between an extended position and a retracted position, and a linkage assembly for moving the suction pad between the extended position and the retracted position;
 wherein the revolving shelf is disposed above the base unit and is pivotally connected to the base unit;
 wherein the linkage assembly comprises a circular ramp, a transfer link, the suction pad and a biasing element;
 wherein the circular ramp has a low position and a high position and is rotatable between the low position and the high position;
 wherein that transfer link has a first end and a second end, the first end abutting the circular ramp and the second end connected to the suction pad;
 the biasing spring configured to bias the first end of the transfer link against the circular ramp;
 wherein, when the first end of the transfer link abuts the low position of the circular ramp, the suction pad is in a retracted position and wherein when the first end of the transfer link abuts the high position of the circular ramp, the suction pad is in an extended position;
 wherein the suction pad has a first curvature about a first axis and a second curvature about a second axis, the first axis being perpendicular to the second axis; and
 wherein the suction pad has an outer surface equipped with a plurality of first round dimples and a plurality of second round dimples.

2. The releaseably mountable revolving shelf of claim 1, wherein the circular ramp is formed integrally with an operating handle.

3. The releaseably mountable revolving shelf of claim 1, wherein the first round dimples are larger than the second round dimples.

4. The releaseably mountable revolving shelf of claim 1, wherein the suction pad comprises an inner support element and an outer pad element.

5. The releaseably mountable revolving shelf of claim 4, wherein the outer pad element is softer than the inner support element.

6. The releaseably mountable revolving shelf of claim 1, wherein light emitting elements are attached to a bottom portion of the releaseably mountable revolving shelf.

7. The releaseably mountable revolving shelf of claim 6, wherein the light emitting elements are LEDs.

8. The releaseably mountable revolving shelf of claim 6, wherein the light emitting elements are removably attachable to the releaseably mountable revolving shelf.

9. The releaseably mountable revolving shelf of claim 1, wherein the first and second ends of the transfer link are ball ends.

10. The releaseably mountable revolving shelf of claim 1, wherein the revolving shelf includes a plurality of drainage slots spaced radially about the shelf.

11. The releaseably mountable revolving shelf of claim 1, wherein the base unit and the revolving shelf include mutually opposed and concentrically aligned, annular bushing surfaces, and an annular bushing disposed there between.

12. The releaseably mountable revolving shelf of claim 11, wherein the annular bushing includes a plurality of bearing elements spaced about the bushing.

13. A releaseably mountable revolving shelf, comprising:
 a base unit, a revolving shelf, a suction pad movable between an extended position and a retracted position, and a linkage assembly for moving the suction pad between the extended position and the retracted position;
 wherein the revolving shelf is disposed above the base unit and is pivotally connected to the base unit;
 wherein the linkage assembly comprises a circular ramp, a transfer link, the suction pad and a biasing element;
 wherein the circular ramp has a low position and a high position and is rotatable between the low position and the high position;
 wherein that transfer link has a first end and a second end, the first end abutting the circular ramp and the second end connected to the suction pad;
 the biasing spring configured to bias the first end of the transfer link against the circular ramp;
 wherein, when the first end of the transfer link abuts the low position of the circular ramp, the suction pad is in a retracted position and wherein when the first end of the transfer link abuts the high position of the circular ramp, the suction pad is in an extended position; and
 wherein the suction pad has a first curvature about a first axis and a second curvature about a second axis, the first axis being perpendicular to the second axis.

14. The releaseably mountable revolving shelf of claim 13, wherein the circular ramp is formed integrally with an operating handle.

15. The releaseably mountable revolving shelf of claim 13, wherein the suction pad has an outer surface equipped with a plurality of first round dimples and a plurality of second round dimples.

16. The releaseably mountable revolving shelf of claim 15, wherein the first round dimples are larger than the second round dimples.

17. The releaseably mountable revolving shelf of claim 13, wherein the suction pad comprises an inner support element and an outer pad element.

18. The releaseably mountable revolving shelf of claim 17, wherein the outer pad element is softer than the inner support element.

19. The releaseably mountable revolving shelf of claim 13, further including LED lighting elements.

20. The releaseably mountable revolving shelf of claim 13, wherein the revolving shelf includes a plurality of drainage slots spaced radially about the shelf.

* * * * *